(12) United States Patent
Chen et al.

(10) Patent No.: US 11,924,722 B2
(45) Date of Patent: Mar. 5, 2024

(54) INFORMATION CONVERTING METHOD AND SYSTEM THEREOF

(71) Applicant: Wistron NeWeb Corporation, Hsinchu (TW)

(72) Inventors: Chun-Nan Chen, Hsinchu (TW); Yuan-Ruei Huang, Hsinchu (TW); Chao-Sheng Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 206 days.

(21) Appl. No.: 17/367,491

(22) Filed: Jul. 5, 2021

(65) Prior Publication Data

US 2022/0312162 A1  Sep. 29, 2022

(30) Foreign Application Priority Data

Mar. 25, 2021 (TW) .................................. 110110756

(51) Int. Cl.
*H04W 4/40* (2018.01)
*H04W 4/80* (2018.01)
(Continued)

(52) U.S. Cl.
CPC ............... *H04W 4/40* (2018.02); *H04W 4/80* (2018.02); *H04W 48/18* (2013.01); *H04W 80/08* (2013.01);
(Continued)

(58) Field of Classification Search
CPC ........... H04W 4/40; H04W 4/42; H04W 4/44; H04W 4/46; H04W 4/48; H04W 80/00;
(Continued)

(56) References Cited

U.S. PATENT DOCUMENTS 6,801,542 B1 * 10/2004 Subbiah .............. H04L 12/6418
370/467
7,274,296 B2 * 9/2007 Baba .................. G06K 19/0739
340/572.1
(Continued)

FOREIGN PATENT DOCUMENTS

WO    WO-9701940 A1 *  1/1997 ............. G01C 21/34

*Primary Examiner* — Warner Wong
(74) *Attorney, Agent, or Firm* — McClure, Qualey & Rodack, LLP

(57) ABSTRACT

An information converting method and a system thereof are configured to convert a first information into a second information. An information obtaining step is performed to obtain the first information corresponding to a first communication protocol and transmit the first information to a converter. The first information includes a first access layer sub-information and an upper-layer protocol sub-information. A first access layer removing step is performed to drive the converter to remove the first access layer sub-information from the first information according to a converting process. A second access layer adding step is performed to drive the converter to add a second access layer sub-information corresponding to a second communication protocol to the first information and combine the second access layer sub-information with the upper-layer protocol sub-information according to the converting process, so that the first information is converted into the second information.

16 Claims, 10 Drawing Sheets

(51) Int. Cl.
*H04W 48/18* (2009.01)
*H04W 80/08* (2009.01)
*H04L 12/28* (2006.01)
*H04L 12/70* (2013.01)
*H04L 51/063* (2022.01)
*H04L 67/565* (2022.01)
*H04L 69/08* (2022.01)
*H04W 8/00* (2009.01)
*H04W 80/00* (2009.01)

(52) U.S. Cl.
CPC .. *H04L 12/2836* (2013.01); *H04L 2012/5618* (2013.01); *H04L 51/063* (2013.01); *H04L 67/565* (2022.05); *H04L 69/08* (2013.01); *H04W 8/00* (2013.01); *H04W 80/00* (2013.01)

(58) Field of Classification Search
CPC ... H04W 80/08; H04W 48/18; H04W 48/185; H04W 4/00; H04W 4/80; H04W 8/001121; H04W 169/08; H04W 4/18; H04L 51/066; H04L 67/565; H04L 2025/03592; H04L 2012/5618; H04L 51/063; H04L 51/58
See application file for complete search history.

(56) References Cited

U.S. PATENT DOCUMENTS

| | | |
|---|---|---|
| 2004/0032881 A1* | 2/2004 | Arai .................. H04L 67/56 370/466 |
| 2005/0025177 A1* | 2/2005 | Huckett .............. H04L 9/40 370/395.5 |
| 2005/0276278 A1 | 12/2005 | Jung et al. |
| 2006/0159102 A1* | 7/2006 | Major .................. H04L 12/66 370/395.6 |
| 2009/0116493 A1* | 5/2009 | Zhu .................. H04Q 11/0428 370/395.3 |
| 2013/0208943 A1* | 8/2013 | Chuang .............. G06T 7/246 382/103 |
| 2019/0045034 A1* | 2/2019 | Alam .................. H04W 40/24 |
| 2022/0070950 A1* | 3/2022 | Szilágyi ............. H04W 76/14 |

\* cited by examiner

INFORMATION CONVERTING METHOD AND SYSTEM THEREOF

RELATED APPLICATIONS

This application claims priority to Taiwan Application Serial Number 110110756, filed Mar. 25, 2021, which is herein incorporated by reference.

BACKGROUND

Technical Field

The present disclosure relates to an information converting method and a system thereof. More particularly, the present disclosure relates to an information converting method for dual communication protocols applied to vehicle-to-everything and a system thereof.

Description of Related Art

Intelligent Transportation System (ITS) is the application of advanced technologies in electronics, communications, computers, controllers and sensors to various transportation systems. ITS improves safety, efficiency and service by transmitting instant information so as to make traffic problems better. Vehicle-to-everything (V2X) is the communication between cars, other vehicles or devices that may affect cars. In recent years, ITS and V2X are experiencing a trend in which Cellular Vehicle-to-Everything (C-V2X) standard gradually replaces Dedicated Short Range Communication (DSRC) standard.

However, the related industries of transportation and communication have re-developed a new device capable of receiving and sending C-V2X information. The new device lacks the ability to send and receive DSRC information, and cannot communicate with the old devices used in DSRC. The conventional solution is to implement a device with dual communication protocols. If companies want to develop the device with dual communication protocols, they will inevitably add additional time of the development, which will affect product launch and increase costs of the development. Therefore, it is quite uneconomical.

In view of this, how to establish an information converting method of dual communication protocols and a system thereof for the problems existing in the conventional solution is indeed highly anticipated by the public and become the goal and the direction of relevant industry efforts.

SUMMARY

According to one aspect of the present disclosure, an information converting method is configured to convert a first information into a second information. The information converting method includes performing an information obtaining step and an information converting step. The information obtaining step is performed to obtain the first information corresponding to a first communication protocol and transmit the first information to a converter. The first information includes a first access layer sub-information. The information converting step is performed to drive the converter to replace the first access layer sub-information of the first information with a second access layer sub-information corresponding to a second communication protocol according to a converting process so as to convert the first information into the second information. The second information corresponds to the second communication protocol.

According to another one aspect of the present disclosure, an information converting method is configured to convert a first information into a second information. The information converting method includes performing an information obtaining step, a first access layer removing step and a second access layer adding step. The information obtaining step is performed to obtain the first information corresponding to a first communication protocol and transmit the first information to a converter. The first information includes a first access layer sub-information and an upper-layer protocol sub-information. The first access layer removing step is performed to drive the converter to remove the first access layer sub-information from the first information according to a converting process. The second access layer adding step is performed to drive the converter to add a second access layer sub-information corresponding to a second communication protocol to the first information, and combine the second access layer sub-information with the upper-layer protocol sub-information according to the converting process so as to convert the first information into the second information. The second information corresponds to the second communication protocol.

According to further another aspect of the present disclosure, an information converting system is configured to convert a first information from a first device into a second information and transmit the second information to a second device. The information converting system includes the first device and a converter. The first device generates the first information corresponding to a first communication protocol. The first information includes a first access layer sub-information and an upper-layer protocol sub-information. The converter is connected to the first device and receives the first information, and includes a storing module and a processing module. The storing module is configured to access the first information and a converting process. The processing module is connected to the storing module and configured to implement an information converting method including performing a first access layer removing step and a second access layer adding step. The first access layer removing step is performed to remove the first access layer sub-information from the first information according to the converting process. The second access layer adding step is performed to add a second access layer sub-information corresponding to a second communication protocol to the first information, and combine the second access layer sub-information with the upper-layer protocol sub-information according to the converting process so as to convert the first information into the second information. The second information corresponds to the second communication protocol.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
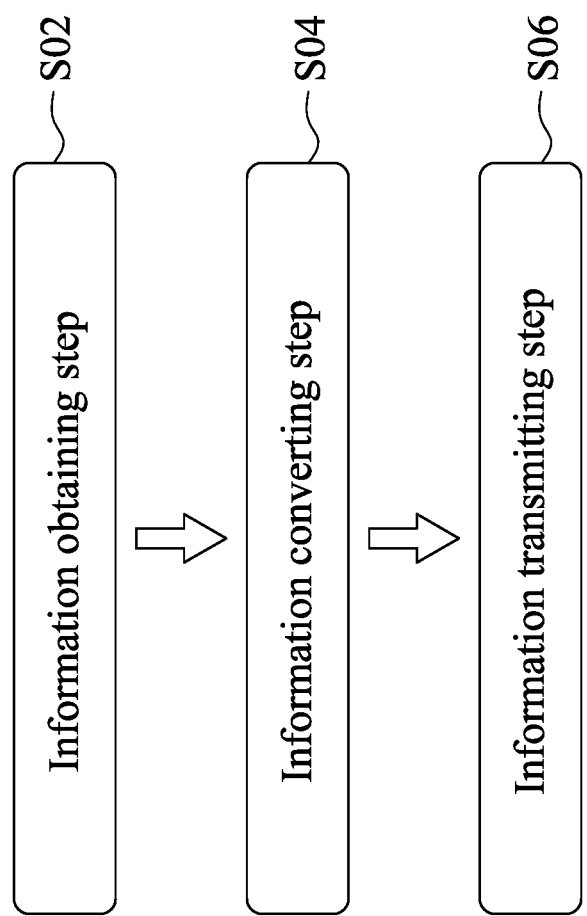
FIG. 1 shows a flow chart of an information converting method according to a first embodiment of the present disclosure.
Figure 2:
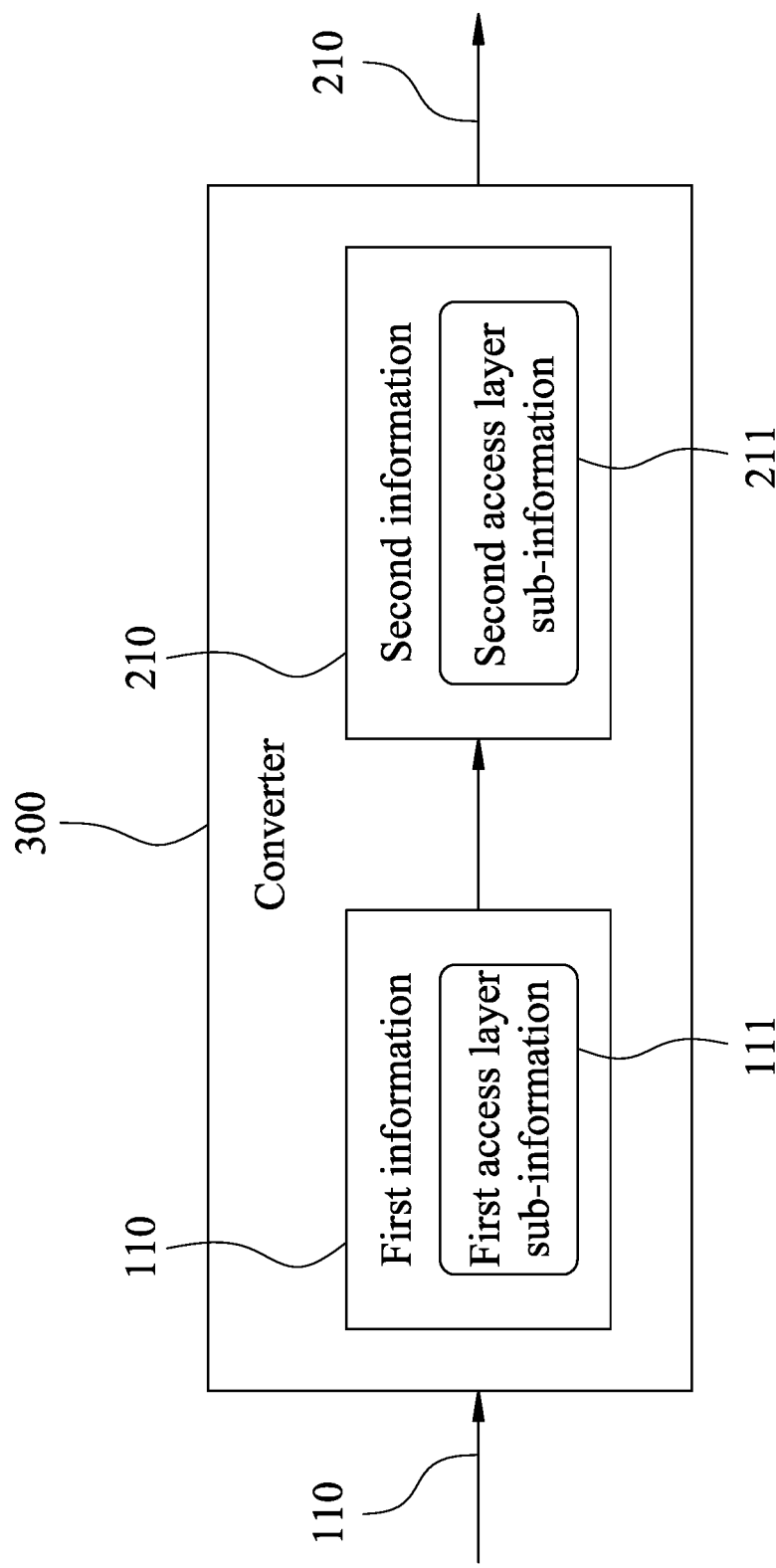
FIG. 2 shows a schematic view of converting a first information into a second information of the first embodiment of the present disclosure.

Please refer to FIGS. 1 and 2. FIG. 1 shows a flow chart of an information converting method 10 according to a first embodiment of the present disclosure. FIG. 2 shows a schematic view of converting a first information 110 into a second information 210 of the first embodiment of the present disclosure. In FIGS. 1 and 2, the information converting method 10 includes performing an information obtaining step S02, an information converting step S04 and an information transmitting step S06, and is configured to convert the first information 110 into the second information 210 through a converter 300. First, the information obtaining step S02 is performed to obtain the first information 110 corresponding to a first communication protocol and transmit the first information 110 to the converter 300. The first information 110 includes a first access layer sub-information 111. Then, the information converting step S04 is performed to drive the converter 300 to replace the first access layer sub-information 111 of the first information 110 with a second access layer sub-information 211 corresponding to a second communication protocol according to a converting process so as to convert the first information 110 into the second information 210. The second information 210 corresponds to the second communication protocol. Finally, the information transmitting step S06 is performed to drive the converter 300 to transmit the second information 210 to a remote electronic device using the second communication protocol.

Therefore, the information converting method 10 of the present disclosure converts the first information 110 using the first communication protocol into the second information 210 using the second communication protocol via the converter 300, so that information can be exchanged between different communication protocols.

Figure 3:
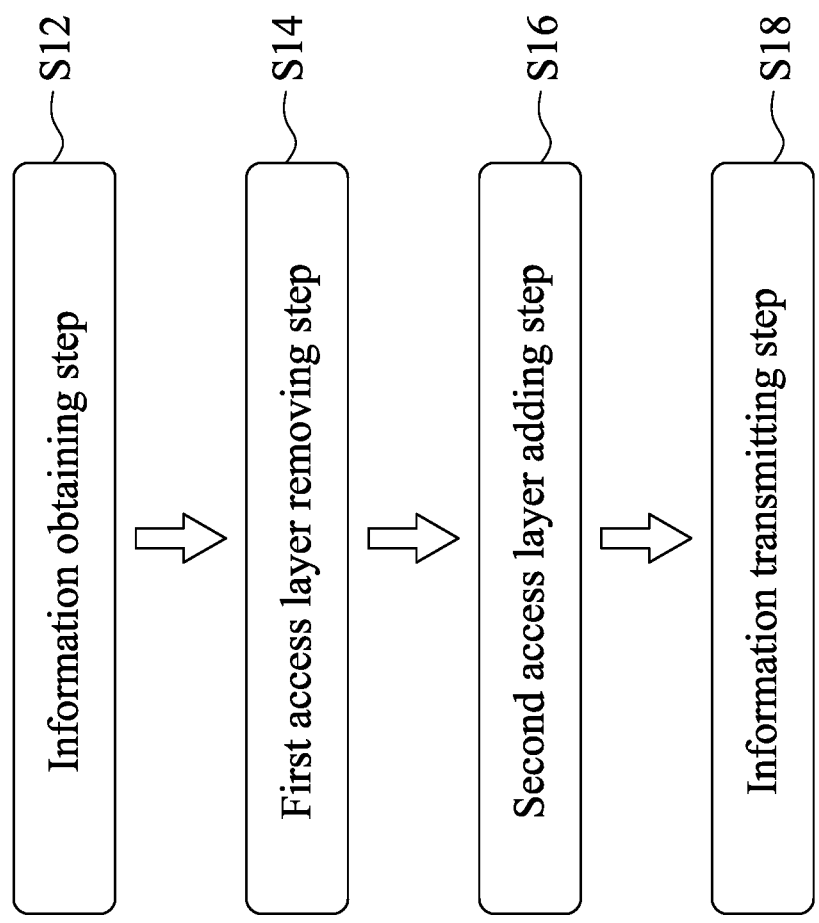
FIG. 3 shows a flow chart of an information converting method according to a second embodiment of the present disclosure.
Figure 4:
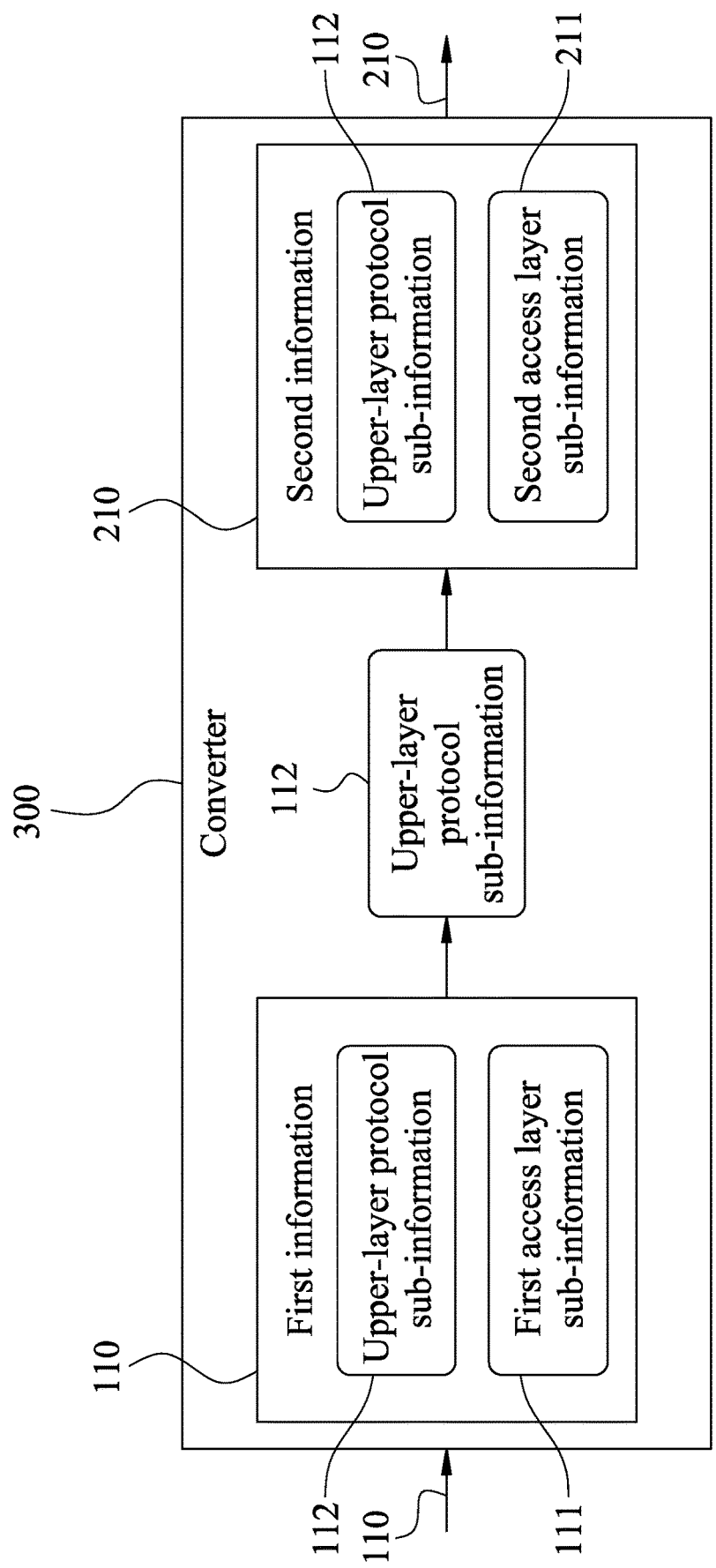
FIG. 4 shows a schematic view of converting a first information into a second information of the second embodiment of the present disclosure.
Figure 5:
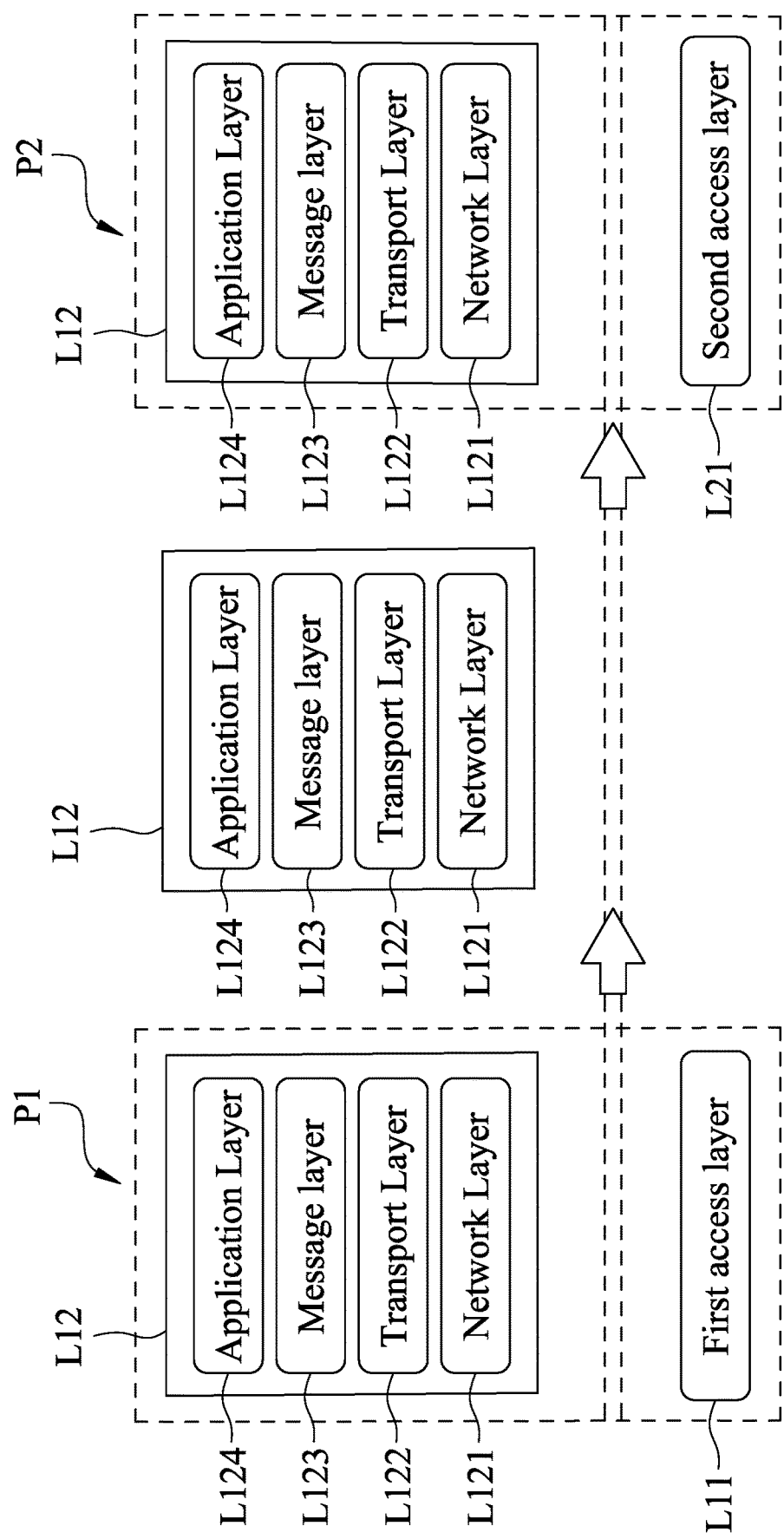
FIG. 5 shows a schematic view of converting a first communication protocol into a second communication protocol of the second embodiment of the present disclosure.

Please refer to FIGS. 3, 4 and 5. FIG. 3 shows a flow chart of an information converting method 20 according to a second embodiment of the present disclosure. FIG. 4 shows a schematic view of converting a first information 110 into a second information 210 of the second embodiment of the present disclosure. FIG. 5 shows a schematic view of converting a first communication protocol P1 into a second communication protocol P2 of the second embodiment of the present disclosure. In FIGS. 3-5, the information converting method 20 includes performing an information obtaining step S12, a first access layer removing step S14, a second access layer adding step S16 and an information transmitting step S18, and is configured to convert the first information 110 into the second information 210 through a converter 300.

The information obtaining step S12 is performed to obtain the first information 110 corresponding to the first communication protocol P1 and transmit the first information 110 to the converter 300. In addition, the first information 110 includes a first access layer sub-information 111 and an upper-layer protocol sub-information 112.

The first access layer removing step S14 is performed to drive the converter 300 to remove the first access layer sub-information 111 from the first information 110 according to a converting process.

The second access layer adding step S16 is performed to drive the converter 300 to add a second access layer sub-information 211 corresponding to the second communication protocol P2 to the first information 110, and combine the second access layer sub-information 211 with the upper-layer protocol sub-information 112 according to the converting process so as to convert the first information 110 into the second information 210. The second information 210 corresponds to the second communication protocol P2.

The information transmitting step S18 is performed to drive the converter 300 to transmit the second information 210 to a remote electronic device using the second communication protocol P2.

In detail, the first communication protocol P1 includes a first access layer L11 corresponding to the first access layer sub-information 111 and an upper protocol layer L12 corresponding to the upper-layer protocol sub-information 112. The second communication protocol P2 includes a second access layer L21 corresponding to the second access layer sub-information 211 and an upper protocol layer L12. Especially, the upper protocol layer L12 of the first communication protocol P1 is the same as the upper protocol layer L12 of the second communication protocol P2; in other words, the upper-layer protocol sub-information 112 of the first information 110 is the same as the upper-layer protocol sub-information 112 of the second information 210. Furthermore, the upper protocol layer L12 includes a network layer L121, a transport layer L122, a message layer L123, and an application layer L124.

Moreover, either the first communication protocol P1 or the second communication protocol P2 can be either a Dedicated Short Range Communication (DSRC) standard or a Cellular Vehicle-to-Everything (C-V2X) standard. The first communication protocol P1 and the second communication protocol P2 are different from each other. Hence, the information converting method 20 of the present disclosure retains the upper-layer protocol sub-information 112 of the first information 110 and replaces the first access layer sub-information 111 of the first information 110 with the second access layer sub-information 211 by the converter 300 to generate the second information 210 using the second communication protocol P2, thereby overcoming the limitation that the information carried in the first information 110 can only be read and decoded by the electronic device using the first communication protocol P1.

Figure 6:
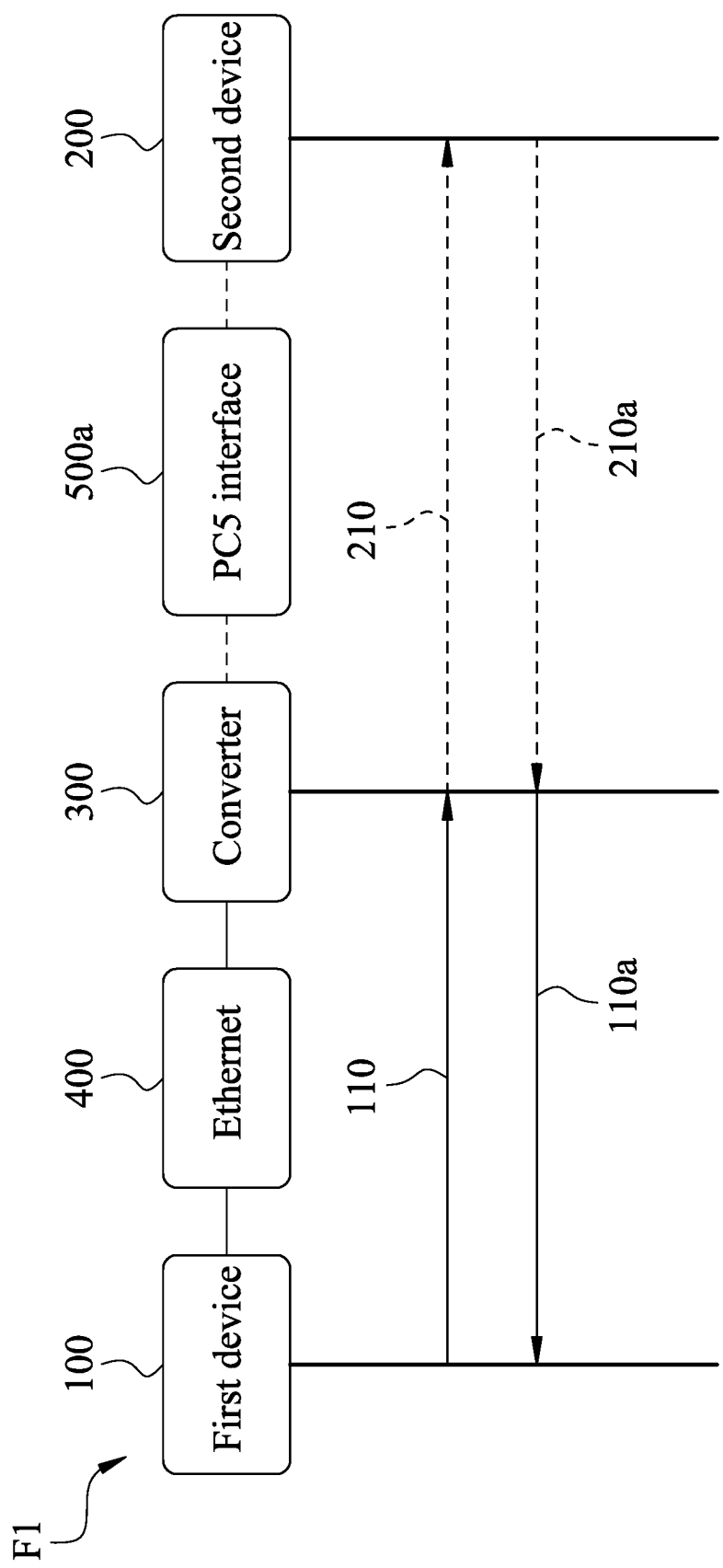
FIG. 6 shows a schematic view of a communication exchange among a first device, a second device and a converter of the present disclosure in a field using a Cellular Vehicle-to-Everything standard.

Please refer to FIGS. 3-5 and 6. FIG. 6 shows a schematic view of a communication exchange among a first device 100, a second device 200 and the converter 300 of the present disclosure in a field F1 using the C-V2X standard. In FIG. 6, the first device 100, the second device 200 and the converter 300 are constructed in the field F1 using the C-V2X standard. However, the first device 100 adopts the first communication protocol P1, and the first communication protocol P1 is the DSRC standard. The second device 200 adopts the second communication protocol P2, and the second communication protocol P2 is the C-V2X standard. Therefore, the first communication protocol P1 (i.e., the DSRC standard) adopted by the first device 100 is different from the field F1 (i.e., the C-V2X standard).

In detail, the first access layer L11 of the first communication protocol P1 can be composed of a media access control (MAC) layer, a physical (PHY) layer and a WAVE MAC layer of the DSRC standard. The network layer L121 can be composed of Internet Protocol version 6 (IPv6) and WAVE Short Message Protocol (WSMP) of the DSRC standard. The transport layer L122 can be composed of User Datagram Protocol/Transmission Control Protocol (UDP/TCP) and WSMP of the DSRC standard. The message layer L123 can be composed of Message sublayer of the DSRC standard. The application layer L124 can be composed of Applications of the DSRC standard. Furthermore, in the second communication protocol P2, the second access layer L21 can be composed of PHY, MAC, Radio Link Control (RLC), Packet Data Convergence Protocol (PDCP) and Non-IP of the C-V2X standard.

Moreover, the field F1 in FIG. 6 refers to a vehicle-road communication (OBU-to-RSU/RSU-to-OBU), such as Electronic Toll Collection (ETC), automatically obtaining the front traffic conditions, parking lot information or upload and download of the audiovisual information at single position. The first device 100 can be a Roadside Unit (RSU), and the second device 200 can be an On Board Unit (OBU). However, in other embodiments, the first device 100 and the second device 200 of the present disclosure can also be constructed in other fields applied to a vehicle-to-vehicle communication (OBU-to-OBU), such as the exchange between vehicle security anti-collision information.

In addition, the information obtaining step S12 can include providing the first device 100 to generate the first information 110 corresponding to the first communication protocol P1. The first device 100 carries the converter 300 via an Ethernet 400, so that the converter 300 receives the first information 110 from the first device 100; that is, the converter 300 is electrically connected to the first device 100 through the Ethernet 400 and obtains the first information 110 from the first device 100. The converter 300 is signally connected to the second device 200 via a PC5 interface 500a, and transmits the second information 210 to the second device 200 corresponding to the second communication protocol P2. It is worth explaining that the dotted arrow in FIG. 6 represents wireless transmission, and the solid arrow represents wired transmission. The converter 300 converts the first information 110 not conforming to the field F1 into the second information 210 conforming to the field F1, and successively transmits the second information 210 to the second device 200 (that is, the aforementioned remote electronic device) for the second device 200 to read and decode the second information 210.

Furthermore, the second device 200 can generate a second information 210a corresponding to the second communication protocol P2, and transmit the second information 210a to the converter 300. The converter 300 converts the second information 210a conforming to the field F1 into a first information 110a not conforming to the field F1 for the first device 100 to read and decode the first information 110a. The converting method for converting the second information 210a into the first information 110a is opposite to the information converting method 20, and will not be detailedly described herein.

Figure 7:
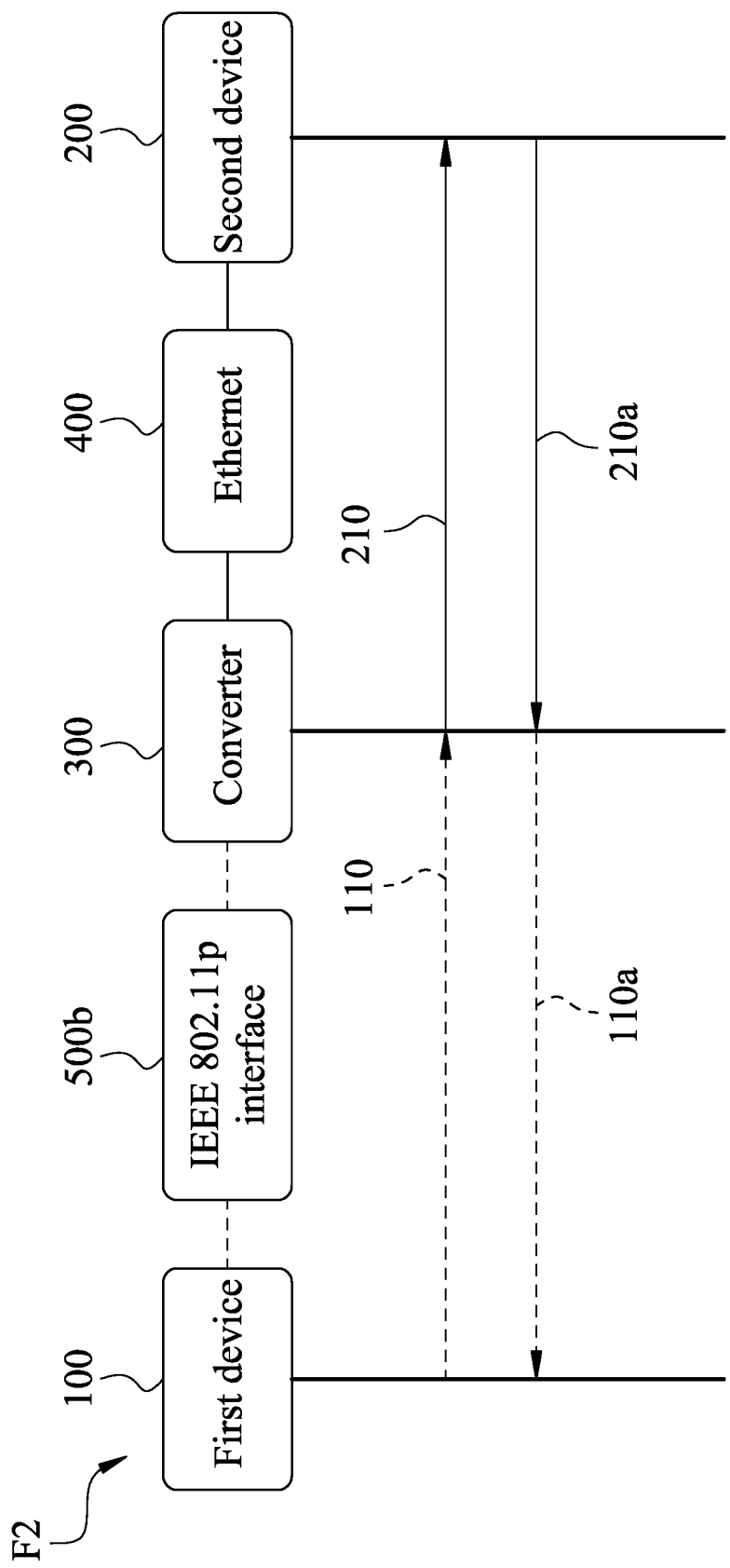
FIG. 7 shows a schematic view of a communication exchange among the first device, the second device and the converter of the present disclosure in a field using a Dedicated Short Range Communication standard.

Please refer to FIGS. 3-5 and 7. FIG. 7 shows a schematic view of a communication exchange among the first device 100, the second device 200 and the converter 300 of the present disclosure in the field F2 using the DSRC standard. In FIG. 7, the first device 100, the second device 200 and the converter 300 are constructed in the field F2 using the DSRC standard. However, the first device 100 adopts the first communication protocol P1, and the first communication protocol P1 is the DSRC standard. The second device 200 adopts the second communication protocol P2, and the second communication protocol P2 is the C-V2X standard. Therefore, the second communication protocol P2 (i.e., the C-V2X standard) adopted by the second device 200 is different from the field F2 (i.e., the DSRC standard).

In detail, the first device 100 can be another OBU, and the second device 200 can be another RSU. The information obtaining step S12 can further include providing the first device 100 to generate the first information 110 corresponding to the first communication protocol P1. The first device 100 transmits the first information 110 to the converter 300 via an IEEE 802.11p interface 500b; that is, the converter 300 is signally connected to the first device 100 through the IEEE 802.11p interface 500b, and obtains the first information 110 from the first device 100. The converter 300 is electrically connected to the second device 200, and carries the second device 200 corresponding to the second communication protocol P2 via an Ethernet 400, so that the converter 300 forwards the second information 210 to the second device 200. It is worth explaining that the dotted arrow in FIG. 7 represents wireless transmission, and the solid arrow represents wired transmission. The converter 300 converts the first information 110 conforming to the field F2 into the second information 210 not conforming to the field F2, and successively forwards the second information 210 to the second device 200 for the second device 200 to read and decode the second information 210.

In addition, the second device 200 can generate a second information 210a corresponding to the second communication protocol P2, and forward the second information 210a to the converter 300. The converter 300 converts the second information 210a not conforming to the field F2 into a first information 110a conforming to the field F2 for the first device 100 to read and decode the first information 110a. Therefore, the converter 300 of the present disclosure can enable the first device 100 and the second device 200 to communicate with each other and transmit information according to the communication protocols used by the fields F1 and F2 or presetting the converting processes conforming to the fields F1 and F2.

Please refer to FIGS. 3-6, Table 1 and Table 2. Table 1 lists the first information 110 received by the converter 300 from the first device 100 using the first communication protocol P1 (i.e., the DSRC standard), wherein the first information 110 is composed of the first access layer sub-information 111 and the upper-layer protocol sub-information 112, and the converter 300 extracts a hexadecimal string corresponding to the first access layer sub-information 111 and the upper-layer protocol sub-information 112. Table 2 lists the second information 210 received by the second device 200 using the second communication protocol P2 (i.e., the C-V2X standard) from the converter 300, wherein the second information 210 is composed of the second access layer sub-information 211 and the upper-layer protocol sub-information 112 retained from the first information 110, but the present disclosure is not limited to Table 1 and Table 2 below.

TABLE 1

| First information 110 | | |
| --- | --- | --- |
| First access layer sub-information 111 | | Upper-layer protocol sub-information 112 |
| 00003e0067000040856e981f000 00000100ce09e04e54800240002 0085000000000001000a010080c 0ff00803cff634fffff856e981f00000 00061000000880000000ffffffffff00 0d41521574ffffffffff106e2500 | 88dc | 030080023c0380390013364350 3c0086bf30000003c990600c04 3034fe00582181a7f002810c0d3 f800c08606e280050480350080 2021a1b2a5b75400810c0d4ca |

TABLE 2

| Second information 210 | |
| --- | --- |
| Second access layer sub-information 211 | Upper-layer protocol sub-information 112 |
| Hexadecimal string corresponding to second access layer sub-information 211 | 030080023c0380390013364350 3c0086bf30000003c990600c04 3034fe00582181a7f002810c0d3 f800c08606e280050480350080 2021a1b2a5b75400810c0d4ca |

SAE J2735 standard defines the exchange messages used in Vehicle-to-everything (V2X). Signal Phase and Timing (SPaT) messages, MAP messages and Traveler Information Message (TIM) are three of the messages used by RSU to inform OBU about the traffic signals, the intersection overview and the traffic information, but the present disclosure is not limited thereto. In Table 1 and Table 2 of the second embodiment, the first information 110 can be a DSRC packet, and the second information 210 can be a C-V2X packet, wherein the first information 110 and the second information 210 include the same SPaT messages.

In particular, the first access layer sub-information 111 can include an Ethertype sub-information, and the first access layer removing step S14 is performed to drive the converter 300 to remove the first access layer sub-information 111 from the first information 110 according to the Ethertype sub-information. In detail, 0x88dc is an Ethernet type used by WSMP. Therefore, the converter 300 can use 0x88dc to distinguish the first information 110 into the first access layer sub-information 111 and the upper-layer protocol sub-information 112, and remove the 0x88dc and the hexadecimal string before 0x88dc from the first information 110. In addition, since the second information 210 still needs to use the Ethernet type used by WSMP, the hexadecimal string corresponding to the second access layer sub-information 211 in Table 2 still have 0x88dc, so that the converter 300 can use 0x88dc to combine the second access layer sub-information 211 with the upper-layer protocol sub-information 112 to generate the second information 210.

Figure 8:
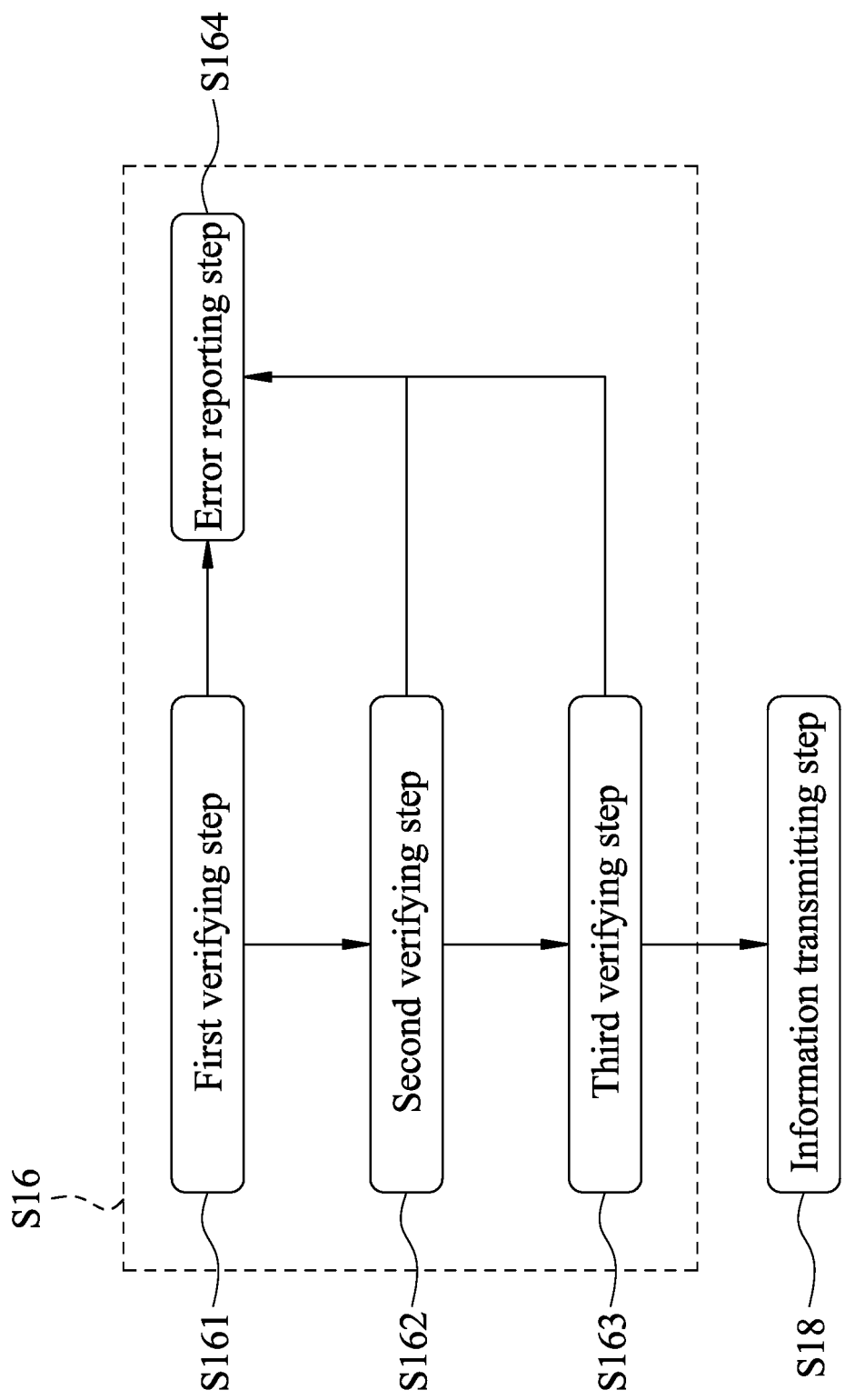
FIG. 8 shows a flow chart of a second access layer adding step and an information transmitting step of FIG. 3.

Please refer to FIGS. 3-6 and 8. FIG. 8 shows a flow chart of the second access layer adding step S16 and the information transmitting step S18 of FIG. 3. In FIG. 8, the second access layer adding step S16 can include performing a first verifying step S161, a second verifying step S162, a third verifying step S163, and an error reporting step S164.

The first verifying step S161 is performed to drive the converter 300 to verify whether a short message protocol header of the upper-layer protocol sub-information 112 conforms to the format of WSMP. The short message protocol header is composed of WSMP-N-Header and WSMP-T-Header. WSMP-N-Header contains information in the network layer L121, and WSMP-T-Header contains information in the transport layer L122. It is worth noting that the network layer L121 needs to correspond to Network layer of Open System Interconnection (OSI) model provided by IEEE1609.3 standard. The transport layer L122 needs to correspond to Transport Layer of OSI model provided by the IEEE1609.3 standard. Therefore, the converter 300 confirms whether the upper-layer protocol sub-information 112 retained from the first information 110 conforms to the formats of IEEE1609.3 standard, IEEE1609.2 standard and SAE J2735 standard before forwarding the second information 210 to the second device 200.

Table 3 lists a format and a frame length of WSMP-N-Header. Table 4 lists a standard format and a frame length of WSMP-T-Header. Table 5, Table 6, Table 7 and Table 8 list a plurality of actual formats and a plurality of frame lengths of WSMP-T-Header corresponding to four values of TPID in Table 3; in other words, the values of TPID determine the contents in the actual format of WSM P-T-Header.

TABLE 3

| WSMP-N-Header | | | | |
| --- | --- | --- | --- | --- |
| Subtype | WSMP-N-Header Option Indicator | WSMP Version | WAVE Information Element Extension | TPID |
| 4 bits | 1 bit | 3 bits | variable | 8 bits |

TABLE 4

WSMP-T-Header

| Address Info | WAVE Information Element Extension | WSM Length |
|---|---|---|
| variable | variable | variable |

TABLE 5

WSMP-T-Header (TPID = 0)

| PSID | WSM Length |
|---|---|
| variable | variable |

TABLE 6

WSMP-T-Header (TPID = 1)

| PSID | WAVE Information Element Extension | WSM Length |
|---|---|---|
| variable | variable | variable |

TABLE 7

WSMP-T-Header (TPID = 2)

| Source ITS port number | Destination ITS port number | WSM Length |
|---|---|---|
| 2 Octets | 2 Octets | variable |

TABLE 8

WSMP-T-Header (TPID = 3)

| Source ITS port number | Destination ITS port number | WAVE Information Element Extension | WSM Length |
|---|---|---|---|
| 2 Octets | 2 Octets | variable | variable |

In Table 3, the frame length of Subtype is 4 bits and can be represented by a hexadecimal (hex) value. The frame length of WSMP-N-Header Option Indicator is 1 bit. The frame length of WSMP Version is 3 bits. WSMP-N-Header Option Indicator and WSMP Version can be represented by a hex value. The frame length of WAVE Information Element Extension can be variable. The frame length of TPID is 8 bits (that is, 1 Octet), and can be represented by 2 hex values. It is worth noting that the binary value of WSMP-N-Header Option Indicator corresponds to the value of TPID.

In detail, the hex value of the short message protocol header is "030080023c" of the column of the upper-layer protocol sub-information 112 in Table 1, wherein the hex value of WSMP-N-Header is "0300", and the hex value of WSMP-T-Header is "80023c". The converter 300 verifies the hex value of WSMP-N-Header and determines whether the hex value conforms to the format of WSMP-N-Header.

During the verifying process, Subtype is 0. Since 3 in hexadecimal is equal to 0011 in binary, the binary value of WSMP-N-Header Option Indicator is equal to 0, and the binary value of WSMP Version is equal to 011 (i.e., 3 in decimal value). WAVE Information Element Extension is not provided. Especially, the converter 300 sets a protocol version of WSMP (i.e., WSMP Version in Table 3) to 3 and verifies the decimal value of WSMP Version of the short message protocol header according to the protocol version. In addition, since the value of TPID corresponds to the binary value of WSMP-N-Header Option Indicator, TPID is 0. Then, since the TPID is 0 and WAVE Information Element Extension is not provided, the actual format of WSMP-T-Header in the second embodiment is shown in Table 5. The hex value of WSMP-T-Header is 80023c, wherein PSID is 8002, and WSM Length is 3 c. Furthermore, SAE J2735 standard defines the hex value of PSID in the exchange messages used in V2X, and 0x8002 represents the provision of SPaT message services. Finally, the converter 300 confirms that 030080023c conforms to the formats of WSMP-N-Header and WSMP-T-Header. In response to determining that the short message protocol header conforms to WSMP, performing the second verifying step S162.

The second verifying step S162 is performed to drive the converter 300 to verify whether a security service header of the upper-layer protocol sub-information 112 conforms to a payload size of the upper-layer protocol sub-information 112. In detail, the hex value of the security service header is "038039" of the column of the upper-layer protocol sub-information 112 in Table 1, wherein "03" represents a protocol version, "80" represents an unsecured data, and "39" represents the payload size. It is worth noting that the first information 110 transmitted in the second embodiment is a packet that disables the security service function, so that the content of the packet is the unsecured data plus Data Length (i.e., the payload size). In response to determining that the security service header conforms to the payload size, performing the third verifying step S163.

The third verifying step S163 is performed to drive the converter 300 to verify whether a payload sub-information of the upper-layer protocol sub-information 112 conforms to a message identification (i.e., Unique message ID) of WSMP. In detail, the hex value of the payload sub-information is "0013" of the column of the upper-layer protocol sub-information 112 in Table 1. Table 9 is the message identification of the exchange messages used in V2X defined by SAE J2735 standard. Since 0013 in hexadecimal is equal to 10011 in binary, and then converting 10011 in binary into 19 in decimal, 0x0013 represents the message identification of SPaT. Finally, in response to determining that the converter 300 confirms that the payload sub-information (that is, 0x0013) conforms to the message identification, successively performing the information transmitting step S18 to drive the converter 300 to transmit the second information 210.

TABLE 9

| | SAE J2735 standard | | |
|---|---|---|---|
| | MAP | SPaT | TIM |
| Message identification | 18 | 19 | 31 |

Therefore, the information converting method 20 of the present disclosure can prevent the first device 100 from sending useless V2X packets (i.e., the first information 110) to the converter 300 and the second device 200 after being subjected to a Distributed denial-of-service attack (DDoS), thereby avoiding security and performance issues. In addition, if a third party modifies the first information 110 during the converting process, the first information 110 can be wrong. The information converting method 20 of the present disclosure can ensure that the format of the second information 210 having converted still conforms to the formats of IEEE1609.3 standard, IEEE1609.2 standard and SAE J2735 standard before the second information 210 is transmitted to the second device 200 so as to reduce the unnecessary time spent by the second device 200 to read and decode the useless V2X packets.

Figure 9:
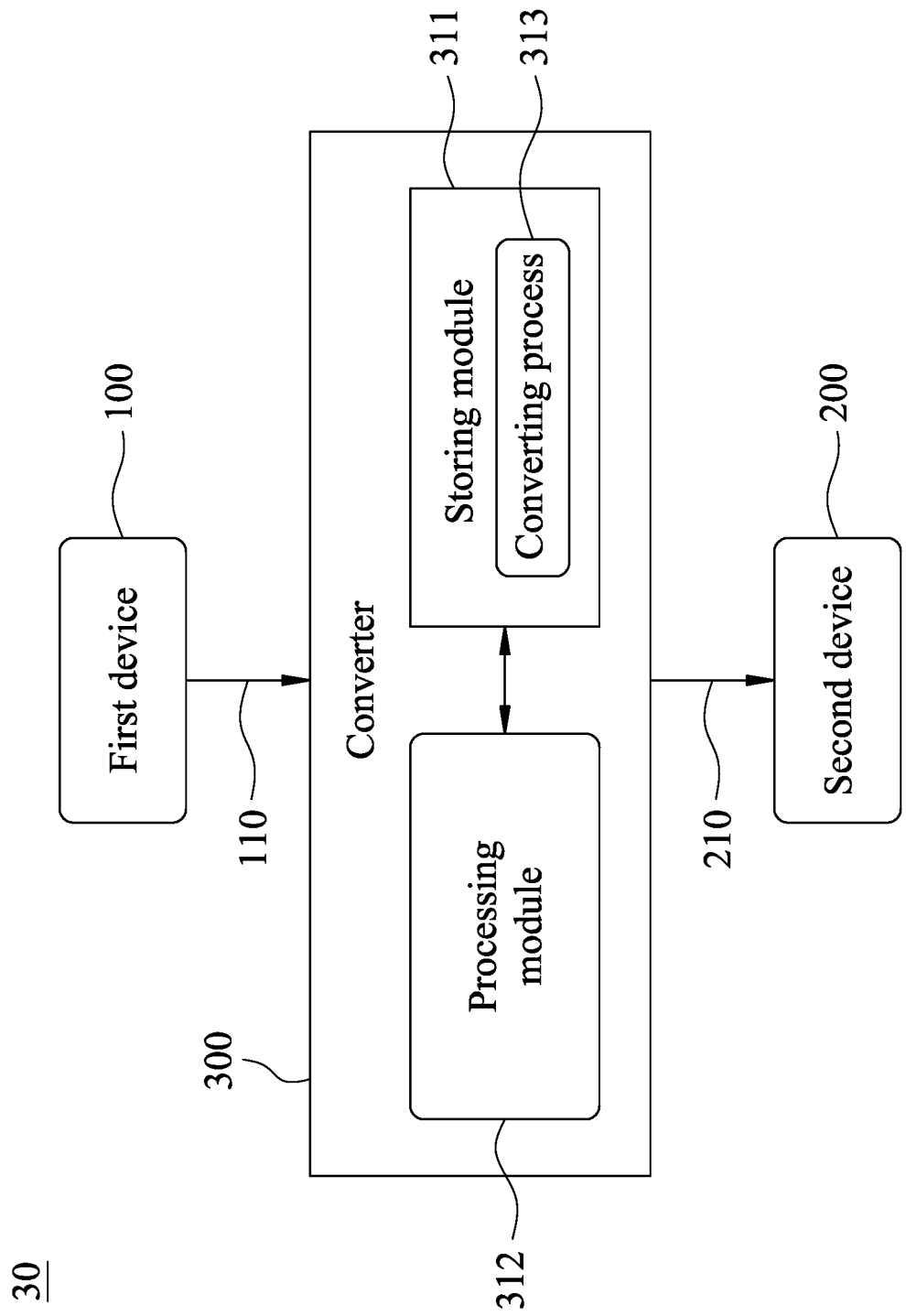
FIG. 9 shows a block diagram of an information converting system according to a third embodiment of the present disclosure.

Please refer to FIGS. 3-8 and 9. FIG. 9 shows a block diagram of an information converting system 30 according to a third embodiment of the present disclosure. In FIG. 9, the information converting system 30 is configured to convert a first information 110 from a first device 100 into a second information 210 and transmit the second information 210 to a second device 200. The information converting system 30 includes the first device 100, the second device 200 and a converter 300. The first device 100 generates the first information 110 corresponding to a first communication protocol P1. The first information 110 includes a first access layer sub-information 111 and an upper-layer protocol sub-information 112. The converter 300 is signally connected to the first device 100 and receives the first information 110, and includes a storing module 311 and a processing module 312. The storing module 311 is configured to access the first information 110 and a converting process 313. The processing module 312 is electrically connected to the storing module 311.

In addition, the processing module 312 is configured to implement the information converting method 20 including performing the first access layer removing step S14 and the second access layer adding step S16. First, the first access layer removing step S14 is performed to remove the first access layer sub-information 111 from the first information 110 according to the converting process 313. Then, the second access layer adding step S16 is performed to add a second access layer sub-information 211 corresponding to a second communication protocol P2 to the first information 110, and combine the second access layer sub-information 211 with the upper-layer protocol sub-information 112 according to the converting process 313 so as to convert the first information 110 into the second information 210. The second information 210 corresponds to the second communication protocol P2. Finally, the second device 200 is signally connected to the converter 300 and receives the second information 210.

Figure 10:
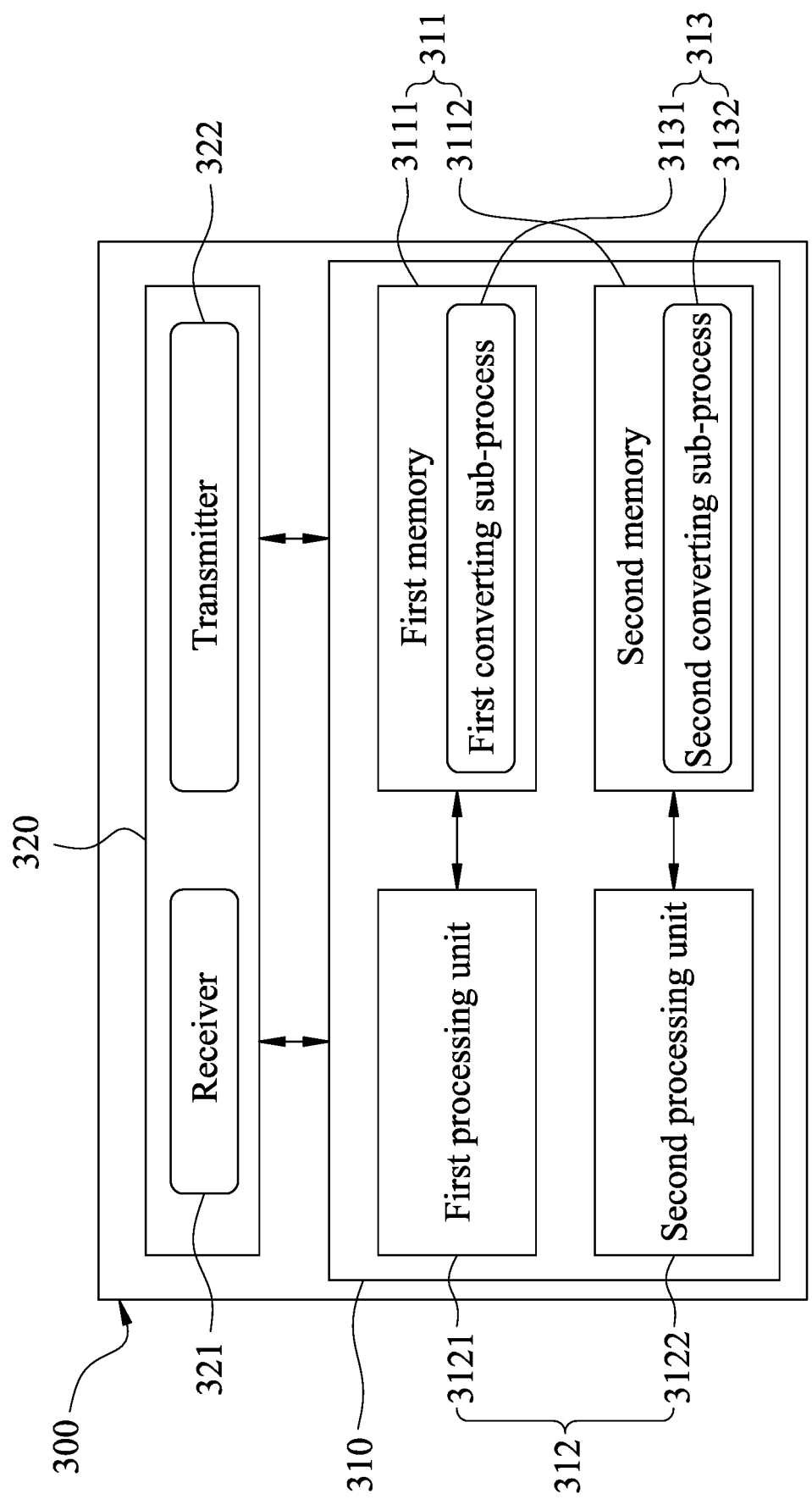
FIG. 10 shows another block diagram of a converter of the information converting system of FIG. 9.

Please refer to FIGS. 3-9 and 10. FIG. 10 shows another block diagram of the converter 300 of the information converting system 30 of FIG. 9. In FIG. 10, the converter 300 can include an information converting module 310 and a wireless communication module 320. The information converting module 310 includes a storing module 311 and the processing module 312. The wireless communication module 320 includes a receiver 321 and a transmitter 322. The receiver 321 is configured to receive the first information 110 from the first device 100, or receive the second information 210a from the second device 200. The transmitter 322 is configured to forward the second information 210 to the second device 200, or forward the first information 110a to the first device 100.

In addition, the converting process 313 can include a first converting sub-process 3131 corresponding to the second communication protocol P2 and a second converting sub-process 3132 corresponding to the first communication protocol P1. The storing module 311 can include a first memory 3111 and a second memory 3112. The first memory 3111 is configured to access the first converting sub-process 3131. The second memory 3112 is configured to access the second converting sub-process 3132. The processing module 312 can include a first processing unit 3121 and a second processing unit 3122. The first processing unit 3121 is electrically connected to the first memory 3111. The second processing unit 3122 is electrically connected to the second memory 3112.

In detail, the first processing unit 3121 can be a C-V2X chip, and the second processing unit 3122 can be a DSRC chip. In response to determining that the first communication protocol P1 is the DSRC standard and the second communication protocol P2 is the C-V2X standard, the first processing unit 3121 executes the first converting sub-process 3131 and generates the second access layer sub-information 211 corresponding to the C-V2X Standard in the second access layer adding step S16. Then, the first processing unit 3121 adds the second access layer sub-information 211 to the first information 110 which had removed the first access layer sub-information 111, so that the first information 110 is converted into the second information 210.

On the contrary, in response to determining that the first communication protocol P1 is the C-V2X standard and the second communication protocol P2 is the DSRC standard, the second processing unit 3122 executes the second converting sub-process 3132 and generates the second access layer sub-information 211 corresponding to the DSRC standard in the second access layer adding step S16. Then, the second processing unit 3122 adds the second access layer sub-information 211 to the first information 110 which had removed the first access layer sub-information 111, so that the first information 110 is converted into the second information 210.

Accordingly, the information converting system 30 of the present disclosure can selectively use the first processing unit 3121 to execute the first converting sub-process 3131, or use the second processing unit 3122 to execute the second converting sub-process 3132 according to different communication protocols, so that the converter 300 converts the first information 110 to the second information 210.

In summary, the present disclosure has the following advantages: First, it is favorable for converting the first information using the first communication protocol into the second information using the second communication protocol via the converter, so that information can be exchanged between different communication protocols. Second, it is favorable for preventing the first information or the second information from being attacked by DDoS or being modified by a third party during the converting process, which may cause security and performance issues for the first device and the second device. Third, it is favorable for reducing development time and development costs of the current dual-protocol system.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An information converting method, which is configured to convert a first information into a second information, and the information converting method comprising:

performing an information obtaining step to provide a first device to generate the first information corresponding to a first communication protocol and transmit the first information to a converter, wherein the first information comprises a first access layer sub-information and an upper-layer protocol sub-information;

performing a first access layer removing step to drive the converter to remove the first access layer sub-information from the first information according to a converting process; and performing a second access layer adding step to drive the converter to add a second access layer sub-information corresponding to a second communication protocol to the first information and combine the second access layer sub-information with the upper-layer protocol sub-information according to the converting process so as to convert the first information into the second information, wherein the second information corresponds to the second communication protocol;

wherein the first communication protocol is one of a Dedicated Short Range Communication (DSRC) standard and a Cellular Vehicle-to-Everything (C-V2X) standard, the second communication protocol is the other one of the DSRC standard and the C-V2X standard, and the first communication protocol and the second communication protocol are different from each other;

wherein the converter is constructed in a field using either the first communication protocol or the second communication protocol and transmits the second information to a second device, and the field refers to a vehicle-road communication or a vehicle-to-vehicle communication;

wherein one of the first device and the second device is a Roadside Unit (RSU) and the other one of the first device and the second device is an On Board Unit (OBU), or both the first device and the second device are the OBU.

2. The information converting method of claim 1, wherein the second communication protocol is the C-V2X standard, the C-V2X standard is used in the field, and the first device carries the converter via an Ethernet, so that the converter receives the first information;

wherein the first communication protocol is different from the field, and the converter transmits the second information to the second device corresponding to the second communication protocol via a PC5 interface.

3. The information converting method of claim 1, wherein the first communication protocol is the DSRC standard, the DSRC standard is used in the field, and the first device transmits the first information to the converter via an IEEE 802.11p interface;

wherein the second communication protocol is different from the field, and the converter carries the second device corresponding to the second communication protocol via an Ethernet and forwards the second information to the second device.

4. The information converting method of claim 1, wherein the second access layer adding step comprises:

performing a first verifying step to drive the converter to verify whether a short message protocol header of the upper-layer protocol sub-information conforms to a WAVE Short Message Protocol (WSMP);

wherein in response to determining that the short message protocol header conforms to the WSMP, performing a second verifying step.

5. The information converting method of claim 4, wherein the converter sets a protocol version of the WSMP to 3 and verifies the short message protocol header according to the protocol version.

6. The information converting method of claim 4, wherein the second verifying step comprises:

driving the converter to verify whether a security service header of the upper-layer protocol sub-information conforms to a payload size of the upper-layer protocol sub-information;

wherein in response to determining that the security service header conforms to the payload size, performing a third verifying step.

7. The information converting method of claim 6, wherein the third verifying step comprises:

driving the converter to verify whether a payload sub-information of the upper-layer protocol sub-information conforms to a message identification of the WSMP;

wherein in response to determining that the payload sub-information conforms to the message identification, the converter forwards the second information.

8. An information converting system, which is configured to convert a first information from a first device into a second information and transmit the second information to a second device, and the information converting system comprising:

the first device generating the first information corresponding to a first communication protocol, wherein the first information comprises a first access layer sub-information and an upper-layer protocol sub-information; and a converter connected to the first device and receiving the first information, and comprising:

a storing module configured to access the first information and a converting process; and a processing module connected to the storing module, wherein the processing module is configured to implement an information converting method comprising:

performing a first access layer removing step to remove the first access layer sub-information from the first information according to the converting process; and performing a second access layer adding step to add a second access layer sub-information corresponding to a second communication protocol to the first information and combine the second access layer sub-information with the upper-layer protocol sub-information according to the converting process so as to convert the first information into the second information, wherein the second information corresponds to the second communication protocol;

wherein the first communication protocol is one of a Dedicated Short Range Communication (DSRC) standard and a Cellular Vehicle-to-Everything (C-V2X) standard, the second communication protocol is the other one of the DSRC standard and the C-V2X standard, and the first communication protocol and the second communication protocol are different from each other;

wherein the converter is constructed in a field using either the first communication protocol or the second communication protocol and transmits the second information to the second device, and the field refers to a vehicle-road communication or a vehicle-to-vehicle communication;

wherein one of the first device and the second device is a Roadside Unit (RSU) and the other one of the first device and the second device is an On Board Unit (OBU), or both the first device and the second device are the OBU.

9. The information converting system of claim 8, wherein the first access layer sub-information comprises an Ethertype sub-information, and the first access layer removing step comprises:

removing the first access layer sub-information from the first information according to the Ethertype sub-information.

10. The information converting system of claim 8, wherein the converting process comprises a first converting sub-process corresponding to the second communication protocol and a second converting sub-process corresponding to the first communication protocol, wherein, the storing module comprising:
a first memory configured to access the first converting sub-process; and
a second memory configured to access the second converting sub-process; and the processing module comprising:
a first processing unit electrically connected to the first memory; and
a second processing unit electrically connected to the second memory.

11. The information converting system of claim 8, wherein the second communication protocol is the C-V2X standard, the C-V2X standard is used in the field, the first communication protocol is different from the field, the first device carries the converter via an Ethernet, so that the converter receives the first information, and the converter transmits the second information to the second device via a PC5 interface.

12. The information converting system of claim 8, wherein the first communication protocol is the DSRC standard, the DSRC standard is used in the field, the second communication protocol is different from the field, the first device transmits the first information to the converter via an IEEE 802.11p interface, the converter carries the second device via an Ethernet and forwards the second information to the second device.

13. The information converting system of claim 8, wherein the second access layer adding step comprises:

performing a first verifying step to drive the converter to verify whether a short message protocol header of the upper-layer protocol sub-information conforms to a WAVE Short Message Protocol (WSMP);

wherein in response to determining that the short message protocol header conforms to the WSMP, a second verifying step is performed.

14. The information converting system of claim 13, wherein the converter sets a protocol version of the WSMP to 3 and verifies the short message protocol header according to the protocol version.

15. The information converting method of claim 13, wherein the second verifying step comprises:

driving the converter to verify whether a security service header of the upper-layer protocol sub-information conforms to a payload size of the upper-layer protocol sub-information;

wherein in response to determining that the security service header conforms to the payload size, a third verifying step is performed.

16. The information converting method of claim 15, wherein the third verifying step comprises:

driving the converter to verify whether a payload sub-information of the upper-layer protocol sub-information conforms to a message identification of the WSMP;

wherein in response to determining that the payload sub-information conforms to the message identification, the converter forwards the second information to the second device.

* * * * *